United States Patent [19]

Oswald

[11] 3,880,735

[45] Apr. 29, 1975

[54] PREPARATION OF THIOL ADDUCTS OF S-PROPENYL DIHYDRO-CARBYL DITHIOPHOSPHATES

[75] Inventor: Alexis A. Oswald, Mountainside, N.J.

[73] Assignee: Exxon Research and Engineering Company, Linden, N.J.

[22] Filed: June 7, 1972

[21] Appl. No.: 260,678

Related U.S. Application Data

[62] Division of Ser. No. 763,997, Aug. 1, 1968, Pat. No. 3,681,219, which is a division of Ser. No. 518,028, Jan. 3, 1966, abandoned.

[52] U.S. Cl.......... 204/158 R; 204/163 R; 252/46.6; 260/928; 260/948; 260/937; 260/968; 260/978; 424/205; 424/216; 424/219
[51] Int. Cl............................. C07f 9/16; A01n 9/36
[58] Field of Search............... 260/968, 609 B, 948; 204/158 R

[56] References Cited
OTHER PUBLICATIONS

Migrdichian, "Organic Synthesis," Vol. 1, (1957), Reinhold Publishing Corp., New York, p. 92.

*Primary Examiner*—Anton H. Sutto
*Attorney, Agent, or Firm*—Frank A. Santoro

[57] ABSTRACT

S-2-hydrocarbomercaptopropyl dialkyldithiophosphates are obtained by reacting S-propenyl dihydrocarbyldithiophosphates with an organic thiol at a temperature of between −80°C and 100°C in the presence of a free radical initiator.

7 Claims, No Drawings

PREPARATION OF THIOL ADDUCTS OF S-PROPENYL DIHYDRO-CARBYL DITHIOPHOSPHATES

CROSS REFERENCE TO RELATED APPLICATIONS

This is a division of my application Ser. No. 763,997, filed Aug. 1, 1968 which is now U.S. Pat. 3,681,219, which in turn is a division of my application Ser. No. 518,028, filed Jan. 3, 1966, now abandoned.

This invention relates to novel organo-phosphorus compounds and to novel processes for preparing same. In particular, this invention relates to S-propenyl dihydrocarbyldithiophosphates and derivatives thereof, e.g., S-2-alkylmercaptopropyl dialkyldithiophosphates. More particularly, this invention relates to the preparation of S-propenyl dialkyldithiophosphates by the reaction between a dialkyldithiophosphoric acid and methyl acetylene in the presence of a non-chemical-free radical initiator and to the further free radical type reaction of the resultant S-propenyl dialkyldithiophosphate with an organic thiol compound.

The reaction between 0,0'-dihydrocarbyldithiophosphoric acids and a variety of unsaturated organic compounds is known to produce mono- and diadducts of the unsaturate. Some of these adducts possess properties which make them suitable as lubricating oil additives and/or pesticides. The importance of selected members of this known group of adducts has stimulated interest in other organo-phosphorus compounds.

It is known in the prior art that acetylene and substituted acetylenes can be reacted with an equimolar amount of a dialkyldithiophosphoric acid in the presence of a chemical free radical initiator to form the corresponding vinyl phosphate free radical monoadduct. See, for example, U.S. Pat. No. 3,067,232. In the present invention, we have found surprisingly that methylacetylene and a dialkyldithiophosphoric acid react in the presence of chemical free radical initiators to yield a different type product, i.e., a diadduct formed by the following series of reactions:

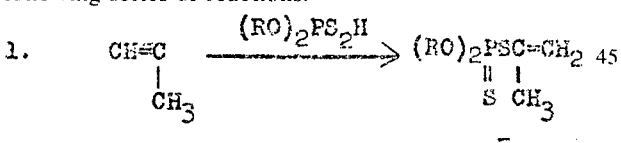

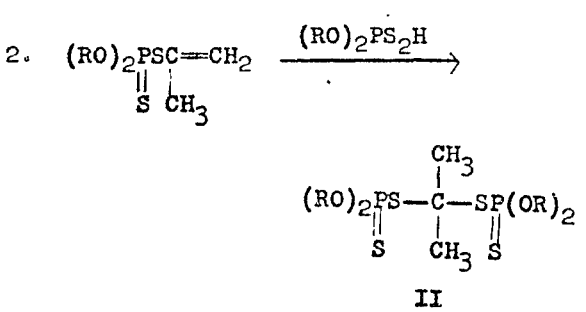

It was furthermore observed that the monoadduct precursor, i.e., S-isopropenyl dialkyldithiophosphate (I), of this diadduct, 2,2-bis-dialkylthiophosphorylmercapto-propane (II), could not be isolated. It is assumed that under these experimental conditions this adduct (I) is extremely reactive towards another mole of dialkyldithiophosphoric acid.

The structure of the final product (II) shows that cationic additions took place instead of the expected free radical addition.

However, in accordance with the present invention, it was found that free radical additions can be carried out with methylacetylene if different process conditions are used. At first, it was observed that the ionic additions could be suppressed if highly elevated temperatures are avoided. Free radical reactions on the other hand, could be initiated at ambient temperatures or below by non-chemical means, i.e., by ultraviolet or gamma irradiation. Dependent on the relative molar ratio of reactants these reactions were found to yield either the radical monoadducts, e.g., S-propenyl dialkyldithiophosphate (III), or the radical diadduct, e.g., bis-1,2-dialkylthiophosphorylmercapto-propane (IV), as the main products. These reactions can be depicted as follows:

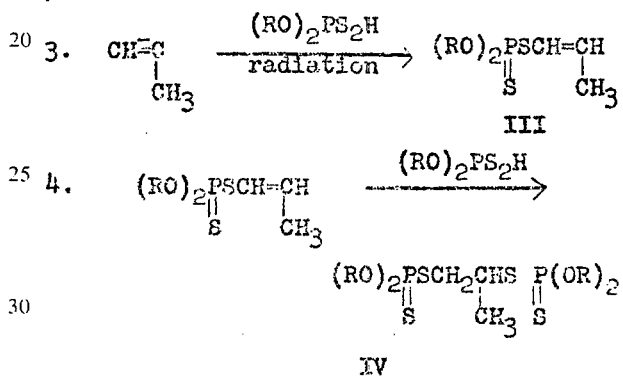

In another embodiment of the present invention, it has been found that S-propenyl dihydrocarbyldithiophosphates, such as depicted by formula III, can be further reacted with an organic thiol to yield mixed radical diadducts of methyl acetylene, e.g., S-2-hydrocarbylmercaptopropyl dialkyldithiophosphate (V), depicted hereinbelow by reaction 5.

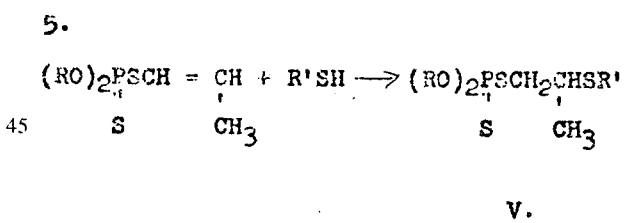

In the preparation of these mixed adducts (V), i.e., reaction 5, radiation and conventional chemical free radical initiators can both be used. The order of these mixed diadditions is, however, extremely important because propenyl hydrocarbyl sulfides react spontaneously with dialkyldithiophosphoric acids in an ionic manner to yield mixed diadducts of a different type. This type of reaction is depicted hereinbelow (reaction 6) to yield S-1-hydrocarbylmercaptopropyl dialkyldithiophosphates (VI).

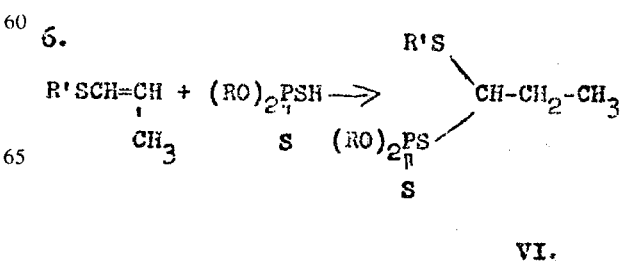

The mixed diadducts of the present invention (Type V) are particularly desirable for pesticidal use. When compared to pesticidal phosphate esters of somewhat similar structure, they showed a relatively low level of toxicity towards warm-blooded animals, i.e., a greater level of safety when used as pesticides. For example, the median lethal dose ($L_D50$) for mice for the compound,

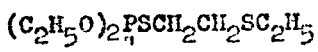

is about 6 mg. per body kg. See the monograph entitled "Die Entwicklung neuer Insektizider Phosphorsaeure-Ester," by Gerhard Schrader published by Verlag Chemie Gmbh., Weinheim/Bergstr., Germany in 1963. In contrast, the mixed diadducts depicted by formula V show $L_D50$ values in the range of 25-250 mg. per kg. of body weight. Moreover, all of the diadducts of the present invention have a primary phosphate ester structure, which is more resistant to hydrolysis than the secondary or tertiary ester structures. From a practical viewpoint, this resistance is very important because these compounds are often used in the form of an aqueous emulsion for pesticidal spray applications.

It is, therefore, an object of the present invention to provide the art with novel adducts of substituted acetylenes. Another object of the present invention is to provide a process for preparing such novel adducts.

Yet another object of the present invention is to provide novel oil additive and agricultural compositions.

The exact nature and objects of the present invention will be more clearly perceived and fully understood by referring to the following description and claims.

The S-propenyl dihydrocarbyldithiophosphates of the present invention are prepared by reacting methyl acetylene with a dihydrocarbyldithiophosphoric acid having one of the following structural formulae:

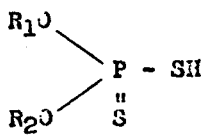    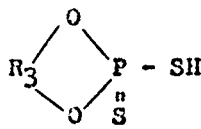

VII.                VIII.

wherein $R_1$ and $R_2$ represent any hydrocarbon radical, such as for example, alkyl, aryl or substituted aryl and $R_3$ is a divalent hydrocarbon radical, such as a $C_1-C_{30}$ alkylene and $C_6-C_8$ phenylene, e.g. ethylene, propylene, trimethylene, O-phenylene, etc. Particularly preferred compounds of this invention are prepared from acids wherein $R_1$ and $R_2$ are each selected from the group consisting of $C_1-C_{30}$ alkyl, $C_6-C_{10}$ aryl, $C_6-C_{30}$ alkaryl or aralkyl, and halo and nitro-substituted $C_6-C_{10}$ aryl. For pesticidal applications, especially preferred compounds are prepared from acids wherein $R_1$ and $R_2$ are each selected from the group consisting of $C_1-C_3$ alkyl and $C_6-C_9$ aryl. In the case where the S-propenyl dihydrocarbyldithiophosphates are employed in lubricating oil compositions, preferred compounds are prepared from dialkyldithiophosphoric acids wherein $R_1$ and $R_2$ are a $C_3-C_{20}$ alkyl.

Suitable examples of $R_1$ and $R_2$ include: (a) methyl, ethyl, n-propyl, i-propyl, butyl, pentyl, octyl, decyl, pentadecyl, octadecyl, dodecyl, eicosyl, docosyl, pentacosyl and triacontyl; (b) phenyl, ethylphenyl, toluyl, xylyl, and naphthyl; (c) 2-chlorophenyl, 3-bromophenyl, o-chloro-toluyl, dichloro-toluyl; and (d) 2-nitro-phenyl, 3-nitro-toluyl, 2-nitro-m-xylyl, and 2,5-dinitro-m-xylyl.

The reaction between methyl acetylene and the dihydrocarbyldithiophosphoric acid can be carried out at a temperature of between about 31 80°C. and about 40°C., preferably between about 0°C. and about 30°C., more preferably, at ambient temperatures, i.e., between about 16°C. and about 28°C. The reaction can be performed in the liquid phase at pressures of between about atmospheric and about 50 atmospheres. However, autogenous pressures resulting from methyl acetylene are preferred.

The catalysts employed in the above-described reaction are non-chemical free radical initiators. Suitable, non-chemical free radical initiators include ultraviolet light and gamma radiation. Ultraviolet light is preferred. In general, the source of the ultraviolet light or gamma (X)-ray radiation is not critical. A 70-watt high pressure mercury arc lamp which emits a light of wide spectrum wavelength can be suitably employed in the laboratory; however, any source of ultraviolet light regardless of the quantity of wattage can be used. It should be noted that the more intense the source, the faster the reaction proceeds. In the case of gamma radiation, 1,000 to 10,000 Curie ($Co^{60}$) source is, for example, suitable to initiate the reaction from a distance of about 6 cm.

In preparing the monoadduct of methyl acetylene and the dihydrocarbyldithiophosphoric acid, mole ratios of methyl acetylene to the dihydrocarbyldithiophosphoric acid can range between about 1:1 and about 5:1. When the principal product desired is the diadduct, the mole ratio of methyl acetylene to the dihydrocarbyldithiophosphoric acid ranges between about 1:3 and about 2:1.

The non-chemical free radical initiated reaction between methyl acetylene and a dihydrocarbyldithiophosphoric acid can be carried out in the presence of an inert diluent. Preferably, no diluent is employed. Suitable diluents which can be employed, if desired, include: $C_2-C_{10}$ aliphatic hydrocarbons, $C_5-C_{10}$ cycloaliphatic hydrocarbons, methyl sulfide, ethers and thioethers.

The mono- and diadducts prepared by the non-chemical free radical initiated reaction between methyl acetylene and the dihydrocarbyldithiophosphoric acid can be represented by the following formulae:

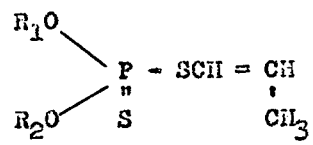

IX

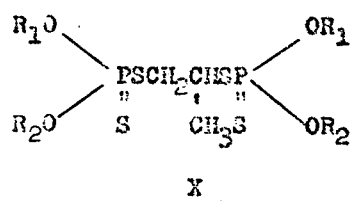

X wherein $R_1$ and $R_2$ are hydrocarbon radicals, as defined hereinabove with respect to the dihydrocarbyldithiophosphoric acids, i.e., formulae VII and VIII.

The diadduct formed by the ionic reaction between methyl acetylene and the dihydrocarbyldithiophosphoric acid can be represented by the following formula:

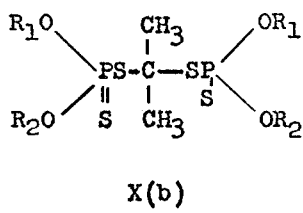

X(b)

wherein $R_1$ and $R_2$ are hydrocarbon radicals, as defined hereinabove with respect to the dihydrocarbyldithiophosphoric acids, i.e., formulae VII and VIII.

In another embodiment of the present invention, it has been discovered that the reaction, (e.g., the above-depicted reaction No. 5) between S-propenyl dihydrocarbyldithiophosphates, the preparation of which has been described previously in this specification, and an organic thiol produce compounds which have excellent utility as pesticides. Organic thiols which can be reacted with the monoadduct (S-propenyl dihydrocarbyldithiophosphate) are represented by the following empirical formula,

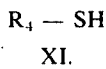

XI.

wherein $R_4$ is selected from the group consisting of $C_1$–$C_5$ alkyl, $C_6$–$C_{10}$ aryl, $C_6$–$C_{10}$ alkaryl, halo-substituted $C_6$–$C_{10}$ aryl, and nitro-substituted $C_6$–$C_{10}$ aryl. Preferably, $R_4$ is a $C_1$–$C_3$ alkyl.

Suitable examples of organic thiols include: methanethiol, ethanethiol, n-propanethiol, i-propanethiol, n-butanethiol, benzenethiol, α-naphthalenethiol, o-toluenethiol, 4-chlorobenzenethiol, 4-nitrobenzenethiol, 3-chloro-p-toluenethiol, 2,4-dichlorobenzenethiol, and 4-methylmercaptobenzenethiol.

The reaction between the organic thiol and the S-propenyl dihydrocarbyldithiophosphate can be carried out at a temperature of between about −80°C. and about 100°C. If radiation is used for reaction initiation, the temperature should be preferably between about 0°C. and about 30°C., and more preferably at ambient temperatures, i.e., between about 16°C. and about 28°C. The preferred temperature range in the case of chemical initiators depends on the decomposition temperature of the initiator compound to be used. Pressures employed are, in general, atmospheric or autogenous, the latter of which can vary up to about 20 atmospheres.

The mole ratio of organic thiol compound to the S-propenyl dihydrocarbyldithiophosphate can vary between about 1:1 and about 10:1. A molar excess of the organic thiol compound is preferred.

The preparation of the mixed diadduct is catalyzed by any conventional free radical initiator, both chemical and non-chemical. Specifically, such catalysts include ultraviolet light, gamma irradiation and a wide variety of organic peroxides, hydroperoxides and azo-compounds conventionally employed as free radical initiators. Typical chemical free radical initiators include: cumene hydroperoxide, t-butyl hydroperoxide, bis-t-butyl peroxide, benzoyl peroxide, azo-bis-isobutyronitrile, etc.

In general, the amount of chemical free radical initiator employed can vary over a broad range, but preferably it will range between about 0.05 and about 5 mole %, based on the total amount of reactants.

Suitable diluents can be employed to prepare the above-described mixed diadducts and those described in connection with the preparation of the S-propenyl dihydrocarbyldithiophosphates are suitable examples thereof. However, as in the case of the monoadduct preparation, it is preferred not to use a diluent.

The mixed diadducts prepared by the free radical initiated reaction between an S-propenyl dihydrocarbyldithiophosphate and an organic thiol can be represented by the following formula:

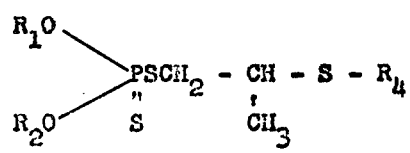

XII wherein $R_1$ and $R_2$ are the hydrocarbon radicals defined hereinabove with respect to the dihydrocarbyldithiophosphoric acids, i.e., formulae VII and VIII, and $R_4$ is the hydrocarbon radical defined hereinabove with respect to the organic thiols, i.e., formula XI.

The novel S-propenyl dihydrocarbyldithiophosphates of the present invention are useful as both pesticides and lubricating oil additives. When employed in lubricating oils, these compounds are used in an amount of between about 0.01 and about 5 wt. %, preferably between about 0.1 and about 1 wt. %. The S-2-hydrocarbyl-mercaptopropyl dialkyldithiophosphates derived from these compounds are useful as pesticides in agricultural compositions.

The inventive process is more particularly described in the following examples, which are intended as illustrative only since numerous modifications and variations therein will be apparent to those skilled in the art.

EXAMPLE 1

A mixture of 94.8 grams (0.6 mole) of dimethyldithiophosphoric acid and 40 grams (1.0 mole) of methyl acetylene was irradiated at 17°C. with ultraviolet light from a high pressure mercury arc of a 75 watt Hanau immersion lamp for 24 hours with magnetic stirring in a closed quartz tube. Subsequent distillation of the reaction mixture yielded 104.8 grams (82%) of S-propenyl dimethyldithiophosphate as a colorless liquid boiling between 60°–64°C. at a pressure of 0.3 mm.

Anal. Calcd. for $C_5H_{11}O_2PS_2$: C, 30.30; H, 5.59; P, 15.62; S, 32.35. Found: C, 29.74; H, 5.50; P, 15.60; S, 32.21.

EXAMPLE 2

A mixture of 93 grams (0.5 mole) of diethyldithiophosphoric acid and 40 grams (1.0 mole) of methyl acetylene was reacted for 65 hours under the conditions of Example 1. Subsequent distillation of the crude product yielded 89.9 grams (79.5%) of S-propenyl diethyldithiophosphate as a yellow-tinted liquid boiling between 74°–78°C. at a pressure of 0.4 mm.

Anal. Calcd. for $C_7H_{15}O_2PS_2$: C, 37.16; H, 6.68; P, 13.68; S, 28.34. Found: C, 36.93; H, 6.55; P, 13.65; S, 28.20.

EXAMPLE 3

A mixture of 47.4 grams (0.3 mole) of dimethyldithiophosphoric acid and 6 grams (0.15 mole) of methyl acetylene was reacted in the manner described in Example 1. The resulting colorless crude product was freed from the volatile S-propenyl dimethyldithiophosphate by-product by heating at 142°C. under 0.2 mm pressure. This resulted in the recovery of 7.20 grams of the monoadduct as a distillate boiling at 55°–60°C. and 36 grams (75%) of the 1,2-bis-dimethylthiophosphorylmercaptopropane diadduct as a slightly-yellow, somewhat viscous, distillation residue.

Anal. Calcd. for $C_{17}H_{18}O_4P_2S_4$: C, 23.59; H, 5.09; P, 17.38; S, 35.99. Found: C, 24.01; H, 5.02; P, 16.92; S, 36.10.

EXAMPLE 4

A mixture of 55.8 grams (0.3 mole) of diethyldithiophosphoric acid and 6 grams (0.15 mole) of methyl acetylene was reacted in the manner described in Example 1. After the unreacted methyl acetylene was allowed to escape, the resulting yellow crude product was heated to 150°C. in vacuo to distill off the by-product, 12.9 grams of S-propenyl diethyldithiophosphate, boiling between 71°–75°C. at a pressure of 0.2 mm. The yellow viscous liquid distillation residue (30 grams, 48.5%) was the desired 1,2-bis-diethylthiophosphorylmercaptopropane.

Anal. Calcd. for $C_{11}H_{26}O_4P_2S_4$: C, 32.03; H, 6.35; P, 15.01; S, 31.10. Found: C, 32.05; H, 6.28; P, 14.7; S, 31.39.

EXAMPLE 5

A mixture of 59 grams (0.25 mole) of diisopropyldithiophosphoric acid and 30 grams (0.75 mole) of methyl acetylene were reacted for 65 hours in the manner described in Example 1. Fractional distillation yielded 62.2 grams (90%) of S-propenyl diisopropyldithiophosphate as a liquid boiling between 68°–69°C. at 0.05 mm.

Anal. Calcd. for $C_9H_{19}O_2PS$: C, 42.50; H, 7.53; P, 12.18; S, 25.21. Found: C, 42.48; H, 7.41; P, 12.34; S, 25.37.

EXAMPLE 6

A stirred mixture of 44.3 grams (0.28 mole) of 90% dimethyldithiophosphoric acid, containing 10% trimethyldithiophosphate, and 20.8 grams (0.52 mole) of methyl acetylene in a Pyrex pressure tube was heated at 40°C. for 65 hours. After releasing the excess of methyl acetylene, a colorless liquid product was obtained which, according to silver nitrate titration, contained only 9% unreacted dimethyldithiophosphoric acid. The latter was removed by washing the solution of the crude reaction product in 300 ml. of ether with two 100 ml. portions of 5% aqueous sodium hydrogen carbonate solution. The ether solution was then dried and the solvent evaporated in vacuo to yield the neutral product. A nuclear magnetic resonance (N.M.R.) spectrum of this product indicated that it was about 85% pure, ionic diadduct, i.e., 2,2-bis-dimethylthiophosphorylmercaptopropane. In addition, there were two compounds present in approximately equal quantities, i.e., the monoadduct and the trimethyldithiophosphate. They were carefully removed by distillation at a pressure of 0.0009 mm. from an 85°C. heating bath. In this manner 32 grams (71%) of pure ionic diadduct was obtained as a yellow distillation residue. This diadduct, when heated to temperatures above 100°C. under 0.8 mm. of pressure, thermally dissociated into the ionic monoadduct, S-isopropenyl dimethyldithiophosphate and dimethyldithiophosphoric acid. These components, however, recombined in the distillation receiver flask at room temperature.

EXAMPLE 7

The reaction described in the previous example was carried out under the same conditions but in the presence of 0.5 grams (0.2 mole) of benzoyl peroxide. The decomposition of the peroxide under the reaction conditions was indicated by the development of reddish brown color and the precipitation of a crystalline solid, apparently benzoic acid. Titration, N.M.R. analysis and workup of the reaction mixture indicated that the ionic diadduct described in the previous example was formed as the main product (31.5 grams, i.e., 70%).

EXAMPLE 8

A mixture of 94.8 grams (0.6 mole) of crude dimethyldithiophosphoric acid and 24 grams (0.6 mole) of methyl acetylene was placed into a glass pressure tube, and irradiated for 18 hrs. by a $Co^{60}$ γ-ray source of about 4,200 Curies intensity placed a 6 cm distance. A nuclear magnetic resonance spectrum of the reaction mixture showed that it contained 55 mole percent of S-propenyl dimethyldithiophosphate, 30 mole percent of bis-2,2-dimethylphosphorylmercapto propane, and 15 mole percent of trimethyldithiophosphate, the latter as an impurity from the starting acid.

EXAMPLE 9

The products of Examples 1–4 and 6 were each dissolved in acetone and dispersed in distilled water with Triton X-100 emulsifier (an alkyl aryl polyether alcohol) to give spray emulsions of 0.025–0.050% concentration. Each of these emulsions were used in standard laboratory insecticidal and miticidal tests as described hereinafter. Portions of the results are tabulated in Table I.

Insecticidal Tests

Housefly tests— Fifty adults of the CSMA (Chemical Specialties Manufacturers' Association) strain were sprayed in a 2 inch × 5 inch diameter stainless steel cage faced on top and bottom with 14 mesh screen. Flies were retained in the cage in which they are sprayed for knockdown observations and 24-hour mortality determinations. Mortality which results from this test may be from residual contact as well as by direct contact spray. DDT at 0.05% concentration was used as the positive standard.

Mexican bean beetle tests — Lima bean leaves sprayed on the dorsal and ventral surfaces were offered to ten larvae of the Mexican bean beetle (late second instar) for a 48-hour feeding period. The feeding rate and mortality data were recorded as well as foliage injury if any. The positive standard was 0.1% methoxychlor.

Pear aphid tests — Adult pea aphids were sprayed and transferred to sprayed pea plants and held for 48-hour mortality determinations. Foliage injury, if any, was recorded. DDT at 0.05% concentration was used as the positive standard.

Systemic insecticidal activity was evaluated by applying 20 ml. spray of the sample to the vermiculite substratum of potted pea plants. Forty-eight hours after application, the plants were infested with 10 adult pea aphids and mortality determination was made after 5 days. Demeton at 0.01% concentration was used as the positive standard.

Miticidal Tests

Spider mite tests — Lima bean plants were infested with 50–100 adults of the strawberry spider mite, *Tetranychus atlanticus*, prior to testing. The infested plants were dipped into the test material and held for 5 days. Adult mortality as well as ovicidal action was noted. Aramite and Ovotran were used as positive standards at 0.1% concentration.

Soil for test purposes was inoculated with infected soil and root knots from infected tomato plants. The sample was blended thoroughly with the soil in a V-shell blender. Four 1-pint paper pots were used for each treatment with one tomato transplant per pot. After 3 to 4 weeks under artificial light and overhead irrigation, the roots of the plant were examined for degree of root knot formation. Inoculated controls normally have about 50–100 root knots per plant. Percent control was determined by a comparison of the knot counts on treated and untreated tomato plants. When tested in this manner, S-propenyl dimethyldithiophosphate showed 100% control.

EXAMPLE 11

The monoadduct of diisopropyldithiophosphoric acid and methyl acetylene (S-propenyl diisopropyldithiophosphate) was prepared as described in Example 5 and tested for activity as a lubricating oil additive. The product of this example was compared with other dialkyldithiophosphates including a zinc salt of a mixture of isobutyl and n-amyl dithiophosphoric acids. In each instance, the composition was prepared by mixing a small amount of the additive (0.1 weight % based on

TABLE I

| Compound | | Spray Conc., % | Mortality, % | | | |
|---|---|---|---|---|---|---|
| | | | Mexican Bean Beetles 48 hrs. | Pea Aphids Contact 48 hrs. | Pea Aphids Systemic 5 days | Mites Contact 5 days |
| Example | Structure | | | | | |
| 1 | $(CH_3O)_2\underset{\underset{S}{\|}}{P}-SCH=CH-CH_3$ | 0.050 | 100 | 50 | 100 | 91 |
| | | 0.025 | 100 | 50 | 100 | 50 |
| 2 | $(C_2H_5O)_2\underset{\underset{S}{\|}}{P}-SCH=CH-CH_3$ | 0.050 | 100 | 100 | 100 | 62 |
| | | 0.025 | 100 | 10 | 50 | 86 |
| 3 | $(CH_3O)_2\underset{\underset{S}{\|}}{P}-SCH_2CH(CH_3)-S\underset{\underset{S}{\|}}{P}(OCH_3)_2$ | 0.050 | 100 | 100 | 0 | 100 |
| | | 0.025 | 100 | 30 | 0 | 50 |
| 4 | $(C_2H_5O)_2\underset{\underset{S}{\|}}{P}-SCH_2CH(CH_3)-S\underset{\underset{S}{\|}}{P}(OC_2H_5)_2$ | 0.050 | 0 | 90 | 0 | 82 |
| 6 | $(CH_3O)_2\underset{\underset{S}{\|}}{P}-S-C(CH_3)_2-S-\underset{\underset{S}{\|}}{P}(OCH_3)_2$ | 0.050 | 50 | 100 | 0 | 100 |

The data of Table I show that all of the compounds tabulated are active pesticides. The data further show that the somewhat more hydrophilic propenyl dithiophosphate monoadducts of Examples 1 and 2 have strong systemic pesticidal action, i.e., they are transported throughout the plant via the plant sap. In contrast, the bis-dithiophosphate adducts of Examples 3, 4 and 6 have only a contact action.

EXAMPLE 10

S-propenyl dimethyldithiophosphate, as prepared in Example 1, was tested as a nematocide at 0.41 grams per gallon of soil equivalent to 100 lbs. per 4-inch acre. In the regular test, root knot nematodes (*Meloidigyne incognita*) were reared in a tomato plant-soil medium.

phosphorus) with a major portion of a mineral lubricating oil. The mineral lubricating oil employed in the tests was S.A.E. 30 grade 100 V. I. oil.

In the oxidation stability test, the oil was aerated at 207°C. (340° ± 1°F.) for 23 hours in the presence of silver and copper-lead specimens attached to a shaft spun at a rate of 600 rpm. The extent of oxidation was measured by the increase of viscosity of the oil. The corrosivity of the oxidized oil appears as a weight change in the metallic specimens. After 3 and 19 hours, these specimens were replaced by new ones; consequently, the weight losses referred to the three intermediate periods between the start of the experiment and 23 hours.

The data shown in Table II indicate that the diisopropyldithiophosphoric acid monoadduct of methyl acetylene has antioxident activity comparable to the activity of the zinc dialkyldithiophosphate.

matography showed it to be a single compound, free of structural isomers and impurities.

TABLE II

| Additive Components | Additive Concentration, % p | ERE Lube Stability Test | | | | 4-Ball Wear Test Scar Diameter, Micron | Extreme Pressure Test Max. Pressure Seizure at - lbs. |
|---|---|---|---|---|---|---|---|
| | | Oxidation, Viscosity, Saybolt. Sec. | | Corrosion, Weight Change. Mg. | | | |
| | | Initial | After Ox. | Ag. | Cu/Pb | | |
| (Base Oil) | 0 | 148 | 381 | −2 | −509 | 0.407 | 1100 |
| Zinc Dialkyl-dithiophosphate | 0.1 | 148 | 161 | −1 | −16 | 0.266 | 1600 |
| S-propenyl diisopropyldithio-phosphate | 0.1 | 145 | 157 | 0 | +43 | 0.238 | 2000 |

The four-ball wear test [H. L. West, J. Inst. Petr. 32, 210, 222 (1946)] was used for the characterization of hydrodynamic lubrication of steel surfaces by the oil. In the test, 3 steel balls were placed in a fixed triangular position and the fourth was mounted above them. The fourth ball was mounted in a chuck so that the assembly could be rotated under pressure while lubricated with the oil to be tested. The tests were carried out at a rotational speed of 1800 rpm under 10 kg. of pressure at 150°C. for 30 minutes. Then, the balls were microscopically examined for scar diameters which are, of course, directly proportional to the wear.

The data of Table II show that the diisopropyldithiophosphoric acid-methyl acetylene monoadduct has better preventive wear properties than the zinc dialkyldithiophosphate.

In the regular extreme pressure test, ["load-bearing capacity SAE" Federal Test Method 6501.02 (15.15.1955)], two lubricated metallic surfaces were turned over each other at a rate of 1,000 rpm with 3.4/1 rubbing ratio under increasing pressure until seizure occurred.

The data of Table II show that the diisopropyldithiophosphoric acid monoadduct of methyl acetylene is superior in this test to the zinc dialkyldithiophosphate.

EXAMPLE 12

A mixture of 44.6 grams (0.2 mole) of S-propenyl diethyldithiophosphate and 18.6 grams (0.3 mole) ethanethiol was irradiated in a quartz vessel with a 75 watt Hanau high pressure ultraviolet lamp under nitrogen with stirring at 17°C. The progress of the addition reaction was followed by nuclear magnetic resonance (N.M.R.) spectroscopy. In the absence of irradiation, no addition occurred. After 2 hours of irradiation, 32% of the S-propenyl diethyldithiophosphate reacted. N.M.R. indicated this degree of disappearance of its olefin unsaturation. In 24 hours, 77% conversion of the olefin was obtained. Subsequently, the liquid reaction mixture was diluted with 150 ml. of ether and washed with two 40 ml. portions of 5% aqueous sodium hydrogen carbonate solution to remove any acidic by-product. The ether phase was then dried over anhydrous sodium sulfate and distilled. After the removal of the ether, the unreacted S-propenyl diethyldithiophosphate was recovered. This was followed by the distillation of 33 grams (77% on the basis of the converted S-propenyl diethyldithiophosphate) of the S-2-ethylmercaptopropyl diethyldithiophosphate as a colorless liquid with a yellow tint, boiling between 100°–102°C. at 0.5 mm. pressure. An N.M.R. spectrum of the product and its elemental analysis confirmed its structure. Gas chromatography showed it to be a single compound, free of structural isomers and impurities.

Anal. Calcd. for $C_9H_{21}O_2PS_2$: C, 37.48; H, 7.33; P, 10.73; S, 33.36. Found: C, 37.45; H, 7.18; P, 10.87; S, 33.7.

EXAMPLE 13

A mixture of 49.5 grams (0.25 mole) of S-propenyl dimethyldithiophosphate and 23.25 grams (0.375 mole) of ethanethiol was reacted in the manner described in Example 12. S-propenyl dimethyldithiophosphate conversions of 45% after 2 hours and 85% after 24 hours were obtained. Sodium hydrogen carbonate washing and subsequent distillation of the reaction mixture yielded 38.7 grams (69%) of S-2-ethylmercaptopropyl diethyldithiophosphate as a colorless liquid boiling between 102°–104°C. at a pressure of 0.3 mm.

Anal. Calcd. for $C_7H_{17}O_2PS_2$: C, 32.29; H, 6.58; P, 11.89; S, 36.95. Found: C, 32.30; H, 6.54; P, 11.73; S, 37.5.

EXAMPLE 14

A mixture of 22.6 grams (0.1 mole) of S-propenyl diethyldithiophosphate and 9.6 grams (0.2 mole) methanethiol was reacted in a quartz pressure tube under autogenous pressure for 24 hours in a manner described in Example 12. N.M.R. indicated 78% conversion. Vacuum distillation yielded 16.6 grams (77.5%) of S-2-methylmercaptopropyl diethyldithiophosphate as a yellow liquid boiling between 101°–104°C. at a pressure of 0.05 mm.

Anal. Calcd. for $C_8H_{19}O_2PS_2$: C, 35.02; H, 6.97; P, 11.29; S, 35.02. Found: C, 35.11; H, 7.04; P, 11.42; S, 34.85.

EXAMPLE 15

A mixture of 38.8 grams (0.2 mole) of S-propenyl dimethyldithiophosphate and 19.2 grams (0.4 mole) of methanethiol was reacted under the conditions of Example 12. After bleeding off the excess of methanethiol, a crude product containing 90% of S-2-methylmercaptopropyl dimethyldithiophosphate was obtained. This was washed as usual to remove the unreacted acid. Subsequent fractional distillation in vacuo yielded 34 grams (70%) purified S-2-methylmercaptopropyl dimethyldithiophosphate as a colorless liquid, boiling between 98°–100°C. at 0.05 mm. pressure.

Anal. Calcd. for $C_6H_{15}O_2PS_2$: C, 29.25; H, 6.13; P, 12.57; S, 39.05. Found: C, 29.58; H, 6.37; P, 12.73; S, 39.22.

EXAMPLE 16

Slowly 20.4 grams (0.2 mole) of propenyl ethyl sulfide were added with stirring and water cooling between 20°–40°C. to 27.2 grams (0.2 mole) of diethyldithiophosphoric acid. An exothermic reaction took place. The intensity of the olefinic hydrogen signals in an N.M.R. spectrum of the resulting reaction mixture showed that 89% of the propenyl ethyl sulfide reacted.

To remove the starting acid the crude mixture was dissolved in 300 ml. ether, washed twice, with 100 ml. portions of 5% aqueous sodium hydrogen carbonate solution. The ether phase was then dried and distilled in vacuo to remove the solvent and the unreacted propenyl sulfide (the last with a bath at 50°C. under 0.05 mm. pressure). In this manner, 35.2 grams (74%) of the adduct were obtained as a residual liquid product. N.M.R. indicated that the structure of the adduct was that of a thioacetal resulting by ionic addition, i.e., S-1-ethylmercaptopropyl diethyldithiophosphate. N.M.R. also indicated a minimum purity of 95% for this product.

Anal. Calcd. For $C_9H_{21}O_2PS_2$: C, 37.47; H, 7.33; P, 10.73; S, 33.36. Found: C, 38.11; H, 7.52; P, 10.47; S, 33.57.

An attempt to further purify the above product by distillation at a pressure of 0.02 mm. resulted in a partial decomposition to yield diethyldithiophosphoric acid. The distilled product, obtained between 106°–108°C., was an adduct of about 90% purity according to N.M.R.

EXAMPLE 17

The compounds of Examples 12–16 were tested as insecticides, miticides and nematocides in the manner described in Examples 9 and 10. In addition, the approximate range of the median lethal oral dosage of the various S-2-alkylmercaptopropyl dialkyldithiophosphates was determined on mice. In this latter test, adult male mice of the Swiss-Webster strain, 30–35 grams in weight, were given a single calculated dose via a stomach syringe and observed for survival during a 2-week period. The data of all these tests are shown in Table III. They indicate that the S-2-alkylmercaptopropyl dialkyldithiophosphate type compounds of the present invention are highly desirable, relatively safe to use pesticides while the isomeric compound having an S-1-alkylmercaptopropyl structure is practically worthless in this respect.

The pesticidal compositions of the present invention may be employed in either solid or liquid form. When used in the solid form, they may be reduced to an impalpable powder mixed with a solid carrier such as clay, talc and bentonite as well as other carriers known in the art. The pesticidal compositions may be applied as an undiluted atomized mist or as a spray solution in a liquid carrier, e.g., as a solution in a solvent or as a spray emulsion in a non-solvent such as water. Typical solvents include such compounds such as acetone, ethyl alcohol, benzene, naphtha, xylenes, etc. Suitable wetting and emulsifying agents which can be employed in preparing the pesticidal aqueous spray emulsions of the present invention include long chain alcohols, such as dodecanol and octadeconol, sulfonated amide and ester derivatives, sulfonated aromatic and mixed alkyl aryl derivatives, esters of fatty acids, such as the ricinoleic ester of sorbitol, and petroleum sulfonates of $C_{10}$–$C_{20}$ length non-ionic emulsifying agents, such as the ethylene condensation products of alkylated phenols. The pesticidal compounds of the present invention can also be admixed with other pesticides in addition to the carriers. In general, the active pesticidal compound represents between about 0.001 and about 5 weight % of the inert carrier.

While there are above-described a number of specific embodiments of the present invention, it is obviously possible to produce other embodiments of various equivalent modifications and variations thereof without departing from the spirit of the invention.

What is claimed is:

1. A process for the selective preparation of S-2-hydrocarbylmercaptopropyl dialkyl dithiophosphates which comprises reacting an S-propenyl dialkyl dithiophosphate, said dithiophosphate having two $C_1$–$C_{30}$ alkyl substituents, and a hydrocarbyl thiol represented by the formula $$R_4 - SH$$

wherein $R_4$ is selected from the group consisting of methanethiol, ethanethiol, and propanethiol, i-propanethiol, n-butanethiol, benzenethiol, α-naphthalenethiol, α-toluenethiol, 4-chlorobenzenethiol, 4-nitrobenzenethiol, 3-chloro-p-toluenethiol, 2,4-dichlorobenzenethiol and 4-methylmercaptobenzene-

TABLE III

| Mixed Methylacetylene Diadduct | | Percent Mortality Produced (By Percent Spray) | | | | | | | Percent Routine Control of Nematodes at 40 lbs. per Acre | Median Lethal Dose (Oral, on Mice) $LD_{50}$ mg/kg |
|---|---|---|---|---|---|---|---|---|---|---|
| | | House Flies 24 Hrs. (0.01) | Mexican Bean Beetles | | Pea Aphids | | Mites | | | |
| Example No. | Structure of Compound (Spray Concentration, percent) | | Contact 48 Hrs. (0.01) | Systemic 5 Days (0.01) | Contact 48 Hrs. (0.001) | Systemic 5 Days (0.001) | Contact 48 Hrs. (0.001) | Systemic 5 Days (0.001) | | |
| 15 | $(CH_3O)_2PSCH_2CHSCH_3$<br>‖ \|<br>S  $CH_3$ | 0 | 30 | 60 | 0 | 100 | 32 | 100 | 100 | 50–100 |
| 13 | $(CH_3O)_2PSCH_2CHSC_2H_5$<br>‖ \|<br>S  $CH_3$ | 0 | 10 | 100 | 10 | 100 | 30 | 100 | 40 | 200–300 |
| 14 | $(C_2H_5O)_2PSCH_2CHSCH_3$<br>‖ \|<br>S  $CH_3$ | 0 | 0 | 100 | 100 | 100 | 49 | 98 | 100 | 25–50 |
| 12 | $(C_2H_5O)_2PSCH_2CHSC_2H_5$<br>‖ \|<br>S  $CH_3$ | 0 | 20 | 70 | 20 | 50 | 0 | 21 | 30 | 25–50 |
| 16 | $(C_2H_5O)_2PSCHSC_2H_5$<br>‖ \|<br>S  $C_2H_5$ | 0 | 0 | 0 | 0 | 0 | 0 | 0 | — | — | thiol, at a temperature of between about −80°C and about 100°C in the presence of a free radical initiator, the mole ratio of hydrocarbyl thiol to S-propenyl dialkyl dithiophosphate being between about 1:1 and 10:1, said S-2-hydrocarbylmercaptopropyl dithiophosphate adduct product being formed substantially free from its adduct isomer.

2. A process according to claim 1 wherein said temperature is between about 0°C and about 30°C.

3. A process for the selective preparation of S-2-hydrocarbylmercaptopropyl dialkyl dithiophosphates, which comprises reacting an S-propenyl dialkyl dithiophosphate of the formula:

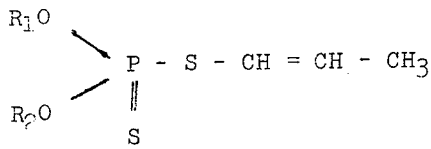

wherein $R_1$ and $R_2$ are each selected from the group consisting of $C_1$–$C_{30}$ alkyl, and a hydrocarbyl thiol of the formula:

$R_4$ —SH wherein $R_4$ is a hydrocarbon thiol selected from the group consisting of methanethiol, ethanethiol, n-propanethiol, i-propanethiol, n-butanethiol, benzenethiol, α-naphthalenethiol, α-toluenethiol, 4-chlorobenzenethiol, 4-nitrobenzenethiol, 3-chloro-p-toluenethiol, 2,4-dichlorobenzenethiol and 4-methylmercaptobenzenethiol, at a temperature of between about −80°C and about 100°C in the presence of a free radical initiator said dithiophosphate adduct product being formed substantially free from its adduct isomer.

4. A process according to claim 3 wherein the mole ratio of said hydrocarbyl thiol and S-propenyl dialkyl dithiophosphate reactants is between about 1:1 and about 10:1.

5. A process according to claim 3 wherein said temperature is between about 0°C and about 30°C and said initiator is radiation.

6. A process for the selective preparation of S-2-alkylmercaptopropyl dialkyl dithiophosphates, which comprises reacting an S-propenyl dialkyl dithiophosphate of the formula:

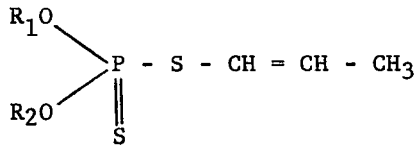

and a hydrocarbyl thiol of the formula $R_4$ — SH wherein $R_1$, $R_2$ and $R_4$ are $C_1$–$C_3$ alkyl in the presence of a free radical initiator at a temperature between about −80°C and about 100°C, said S-2-alkylmercaptopropyl dithiophosphate adduct product being formed substantially free from its adduct isomer.

7. A process for the selective preparation of S-2-methylmercaptopropyl diethyl dithiophosphate, which comprises reacting S-propenyl diethyl dithiophosphate and methanethiol at a temperature between about 0°C and about 30°C in the presence of radiation for initiating a free radical type reaction, said S-2-methylmercaptopropyl adduct product being formed substantially free from its adduct isomer.

* * * * *